(12) United States Patent
Lee

(10) Patent No.: US 7,492,580 B2
(45) Date of Patent: Feb. 17, 2009

(54) ADJUSTING STRUCTURE OF LAPTOP

(75) Inventor: Jack Lee, Taipei (TW)

(73) Assignee: Dialogue Technology Corp., Shindian, Taipei (TW)

( * ) Notice: Subject to any disclaimer, the term of this patent is extended or adjusted under 35 U.S.C. 154(b) by 360 days.

(21) Appl. No.: 11/493,767

(22) Filed: Jul. 27, 2006

(65) Prior Publication Data
US 2008/0024967 A1    Jan. 31, 2008

(51) Int. Cl.
*G06F 1/16* (2006.01)
(52) U.S. Cl. .................... 361/683; 248/917; 455/562.1; 345/156
(58) Field of Classification Search ................. 248/166, 248/917, 205.1; 312/223.1, 107, 128; 345/423, 345/592, 156; 455/418, 562.1; 349/42, 95, 349/187; 361/679–687, 724–727
See application file for complete search history.

(56) References Cited

U.S. PATENT DOCUMENTS

| | | | |
|---|---|---|---|
| 7,333,323 B1* | 2/2008 | Dawson et al. | 361/681 |
| 2006/0291158 A1* | 12/2006 | Allen | 361/683 |
| 2007/0206349 A1* | 9/2007 | Jacobs | 361/683 |

* cited by examiner

*Primary Examiner*—Hung V Duong
(74) *Attorney, Agent, or Firm*—Muncy, Geissler, Olds & Lowe PLLC

(57) ABSTRACT

An adjusting structure of laptop includes a main body with a longitudinal portion and a transverse portion. The longitudinal portion has interior room with an opening on the top and the transverse portion is configured to the laptop host and can be turn around the host. At least one track is configured on the inner wall of the longitudinal portion. A movable component configured in the interior room matching the track moves longitudinally along the track and exposes from the opening. The display-panel of the laptop is configured on the exposed end of the movable component.

12 Claims, 5 Drawing Sheets

ADJUSTING STRUCTURE OF LAPTOP

BACKGROUND OF THE INVENTION

1. Field of the Invention

The present invention generally relates to the adjusting structure of a laptop, and more particularly, to the adjusting structure with the functions of the adjustable position and angle of the display panel of the laptop.

2. Background of the Related Art

A laptop is popular with portable convenience and many consumers gradually use it day by day. Traditionally, the laptop includes a host and a display panel. The display panel and the host are adjustable pivotally connected by continuous hinges along the panel junctions or more discrete hinges distributed along the junction. The display panel is relative to the host with the opening and closing movement. A user opens the display panel to operate the laptop and closes the display panel on the host to stop operating.

However, the display panel is only provided a limited view angle in normal circumstance. It is hard to be suitable for all users with different heights to make users feel tired easily. On the other hand, the laptop is carried to different places for operating. For example, in an aircraft, the operating space is limited due to the lean-backward backseat of the front chair. In that situation, the user cannot open the display panel to suitable position and cannot operate the laptop efficiently.

SUMMARY OF THE INVENTION

In order to make the display panel of the laptop be stretched up and down and leaned forwardly and backwardly, a adjusting structure is connected to a host and a display panel.

In order to fit the ergonomics operation, an adjusting structure of a laptop is provided to distribute widely view angles for a user.

In order to use a laptop conveniently, an adjusting structure of a laptop is provided to solve the troubles with the limited operating space of the display panel.

Accordingly, one embodiment of the present invention provides an adjusting structure, including a main body with a transverse portion and a longitudinal portion, wherein interior room is formed inside the longitudinal portion to form an opening on the top thereon. The transverse portion is adjustable pivotally connected with a host of the laptop. At least one track is configured on the inner wall of the longitudinal portion, and a movable component is configured in the interior room matching the track to move longitudinally along the track and expose from the opening, wherein the display panel of the laptop is configured on the exposed end of the movable component.

BRIEF DESCRIPTION OF THE DRAWINGS

The foregoing aspects and many of the accompanying advantages of this invention will become more readily appreciated as the same becomes better understood by reference to the following detailed description, when taken in conjunction with the accompanying drawings, wherein.

DETAILED DESCRIPTION OF THE INVENTION

The present invention provides an adjusting structure of a laptop to connect a display panel and a host to make the display panel stretched up and down and leaned forwardly and backwardly.

Figure 1:
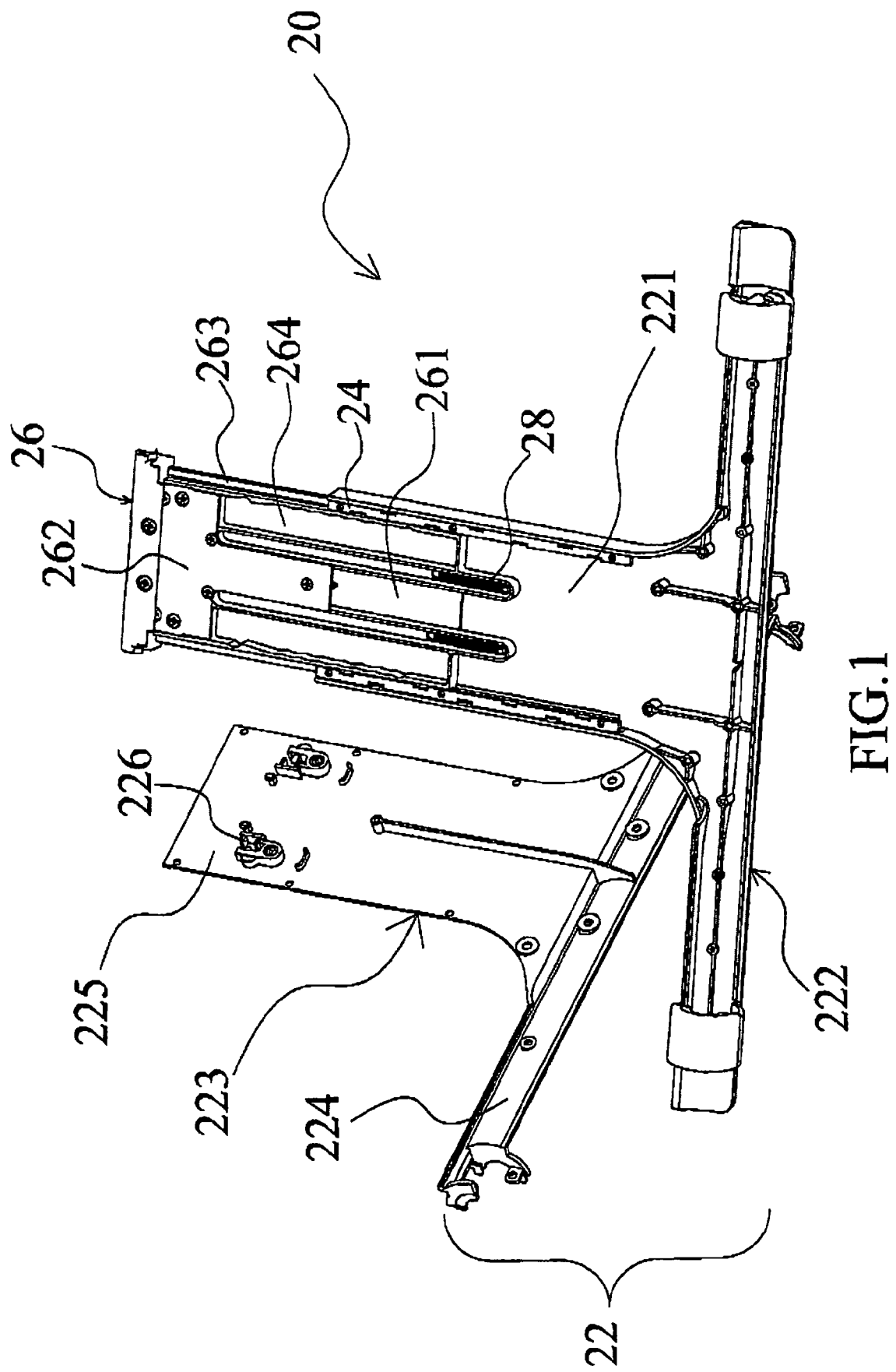
FIG. 1 is a partial disassembling structure diagram illustrating the adjusting structure in accordance with an embodiment of present invention.

FIG. 1 is a partial disassembling structure diagram illustrating the adjusting structure in accordance with an embodiment of present invention. The adjusting structure includes a main body 20, two tracks 24, a movable components 26 and two springs 28, wherein the main body 20 has a front shell body 222 with an interior room 221 and a back shell body 223 assembled to the front shell body 222. The front shell body 222 and the back shell body 223 are T-shaped form and have a transverse portion 224 and a longitudinal portion 225, wherein an opening (not shown) is formed on the top of the longitudinal portion 225. Two tracks 24 are arranged parallelly on the inner wall of the longitudinal portion 225 of the front shell body 222. The movable component 26 includes a movable plate 261 and a T-shaped cover 262, two blocks 263 are arranged on the two side edges of the movable plate 261, respectively to match with the tracks 24 so that movable plate 261 can be moved longitudinally along the tracks 24 and exposed from the opening. The two springs 28 have two ends, one end is configured on the movable plate 261 and another end is configured on the inner wall of the front shell body 222. When the whole movable plate 261 is located in the interior room, the springs 28 are in compressed status.

Figure 2:
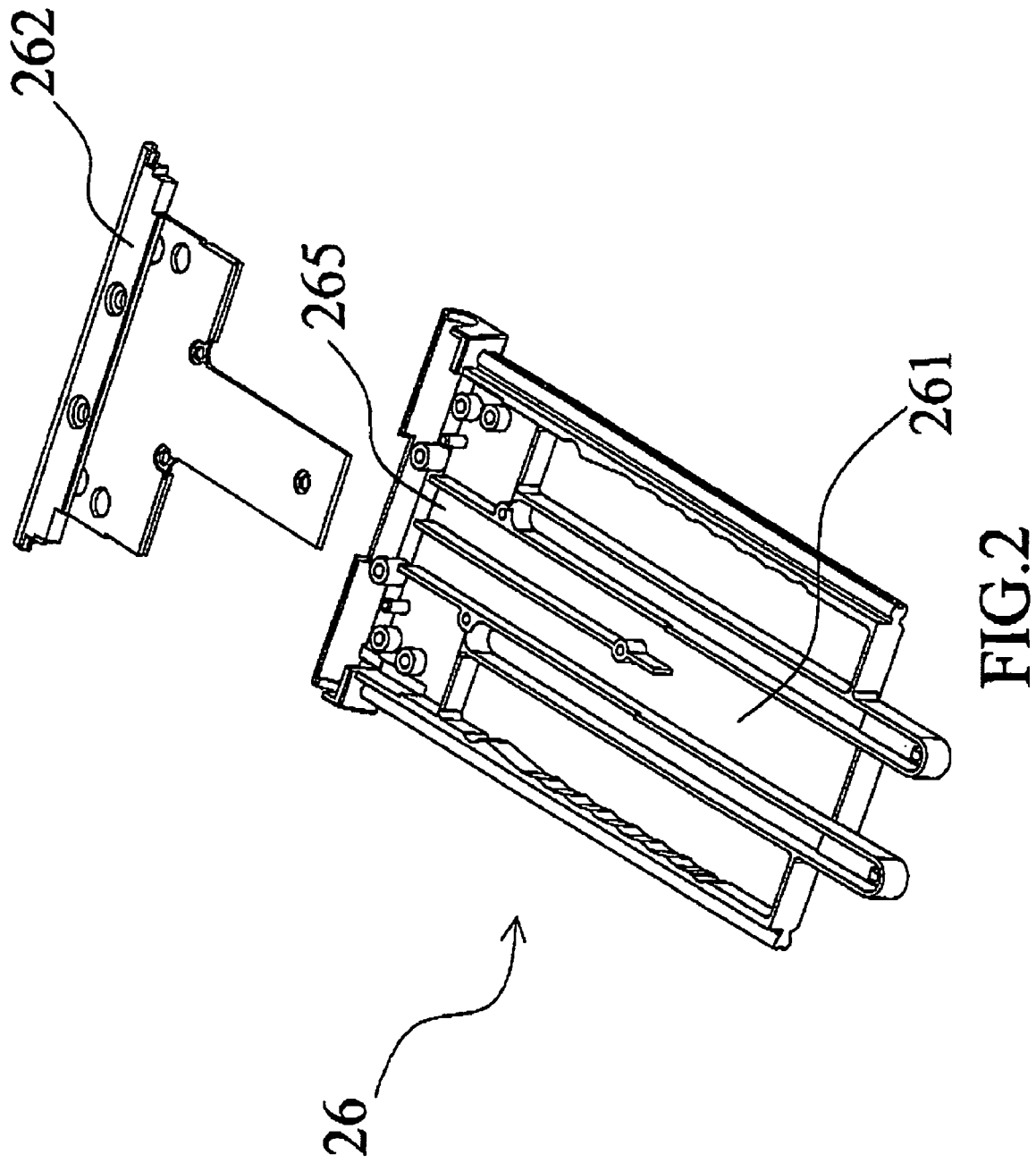
FIG. 2 is a disassembled structure diagram illustrating a movable component of the adjusting structure in accordance with one embodiment of present invention.

Accordingly, two fixing grooves 264 are arranged parallelly and longitudinally on the surface of the movable plate 261 and two fixing blocks 226 are arranged on the inner wall of the back shell body 223 in opposition to the fixing grooves 264. When the movable plate 261 is moved with longitudinal direction inside the interior room, the two fixing grooves 264 move along the fixing blocks 226, respectively to prevent the movable plate 261 from skewing. On the other hand, shown as FIG. 2, a cable groove 265 is arranged inside the movable plate 261 to accommodate the partial wirings of the laptop and a shielding cover 262 is utilized to cover the cable groove 265 to prevent the complex wirings from obstructing the movement of the movable component 26.

One application, shown in FIG. 1, a plurality of balls are used as the transmission interface between the blocks 263 of the movable plate 261 and tracks 24. Thus, the movable component 26 is moved smoothly and stably and positioned at any position of the tracks 24.

In another embodiment of present invention, a friction element is configured between the movable component and the tracks. A linkage mechanism, such as a pressing button, is connected with the friction element that the friction element is controlled by the pressing button to against the movement of the movable component. Accordingly, a latching device is used to replace the friction element and the linkage mechanism to control the movement and position of the movable component. Besides, two tracks arranged on the two sides of the front shell body can be replaced by a signal track arranged on the middle of the front shell body.

Figure 3A:
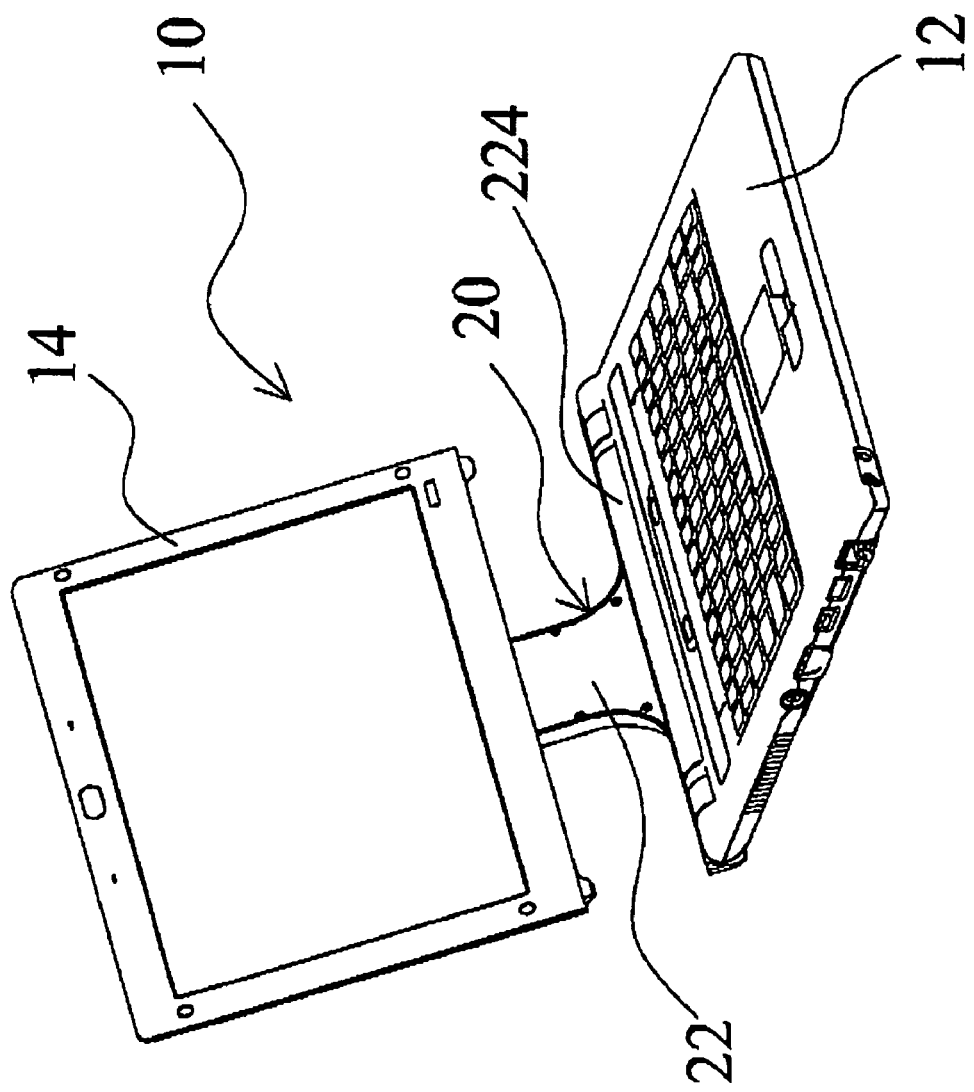
FIG. 3a and FIG. 3b are the diagrams illustrating the adjusting structure applied to a laptop in accordance with two different embodiments of present invention.
Figure 3B:
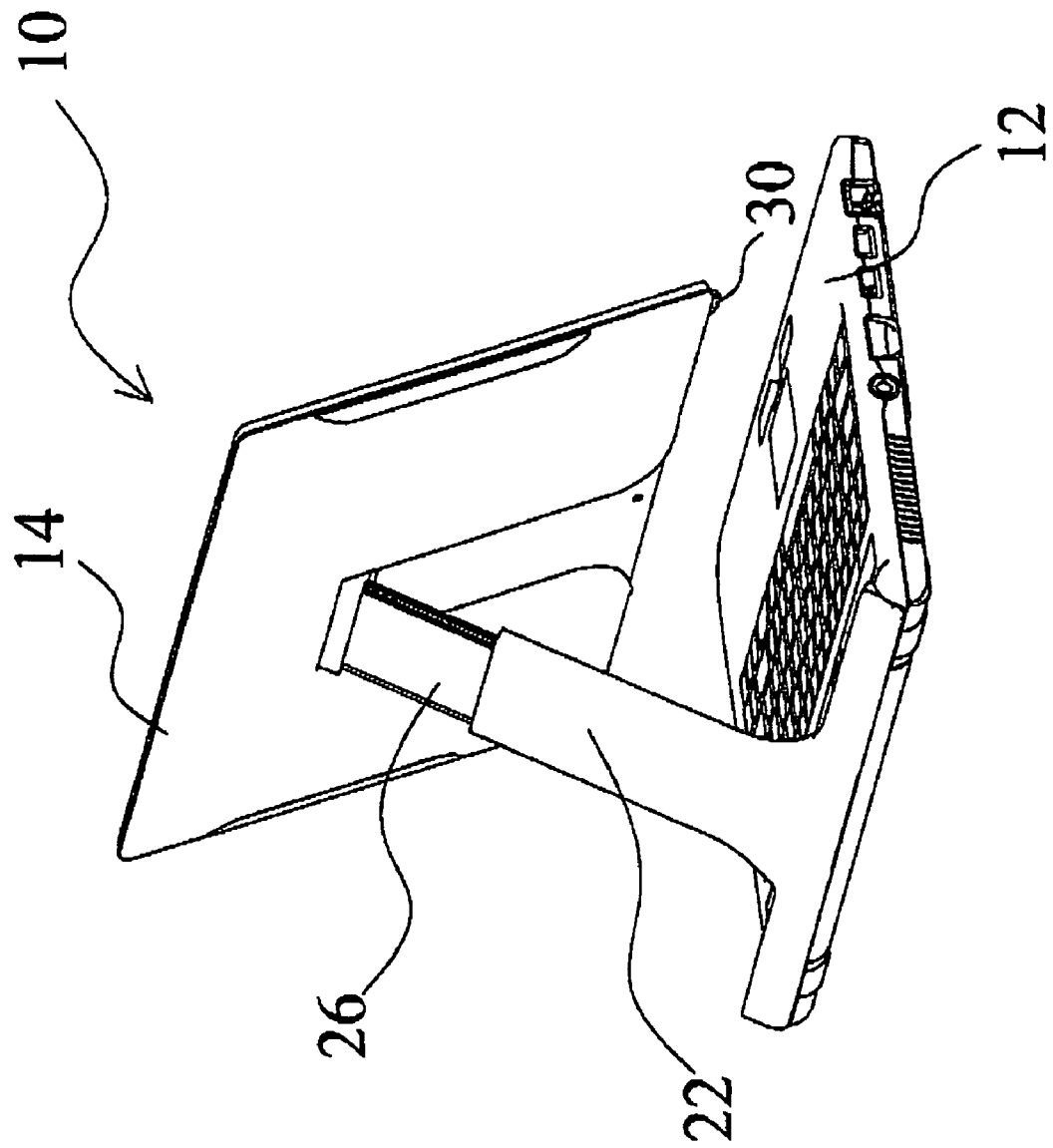

FIG. 3a and FIG. 3b are the diagrams illustrating the adjusting structure applied to a laptop on the embodiment aforementioned. The laptop 10 includes a host 12 and a display panel 14. The transverse portion 224 of the main body 22 is adjustable pivotally connected with the host 12, and the display panel 14 is configured on the exposed end of the movable component 26. Wherein two fixing elements 30 are configured on the lower edge of the display panel 14 and two clip edges (not shown) are configured on the two ends of the transverse portion 224 in relative to the fixing elements 30. When the transverse portion 224 is used to open the display panel 14, the fixing elements 30 are wedged in the clip edges to prevent the display panel 14 from twisting.

Figure 4:
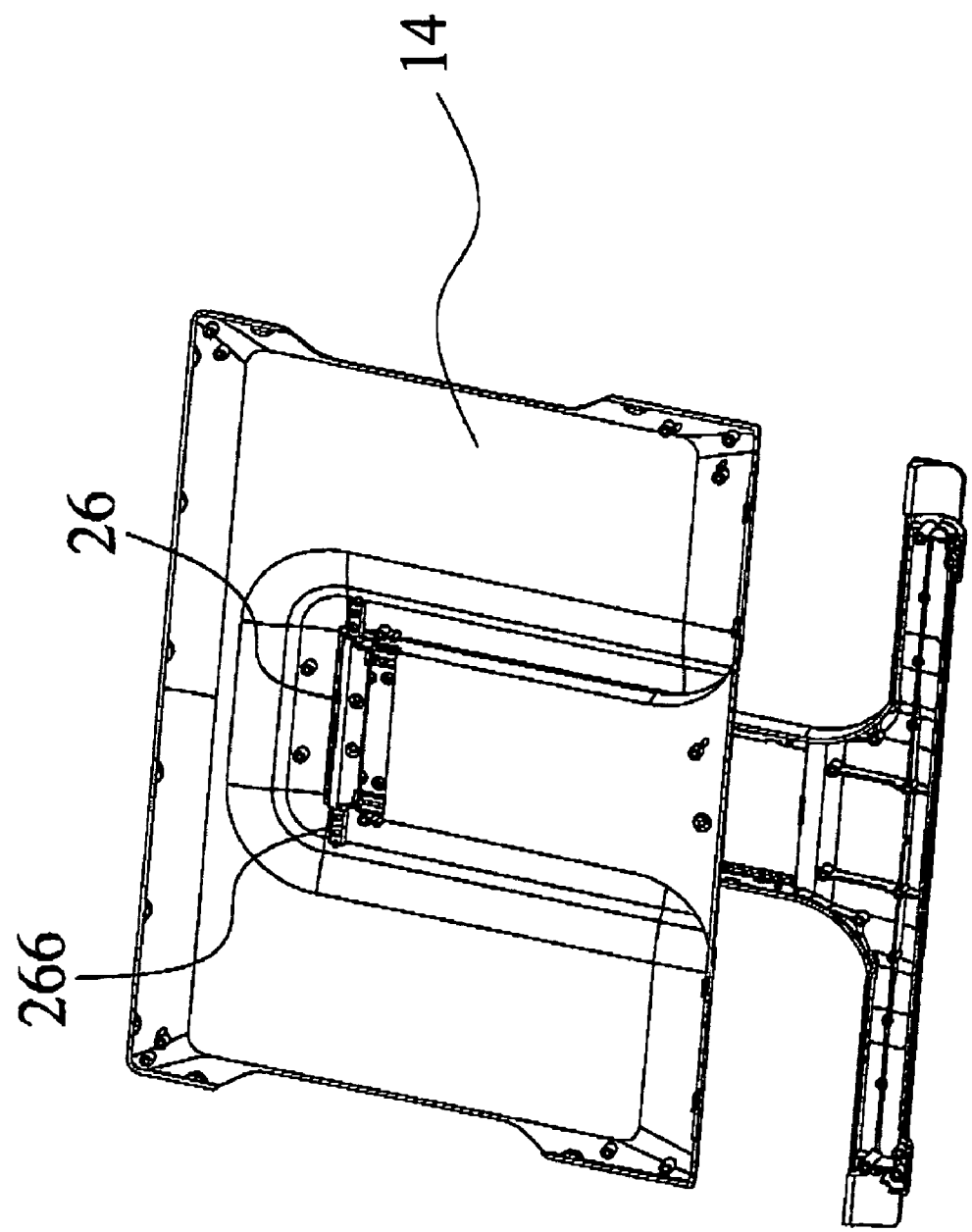
FIG. 4 is an assembled structure diagram illustrating the back plate of the display panel configured to the adjusting structure in accordance with one embodiment of present invention.

On the other hand, as shown in FIG. 4, two transverse pivots 266 are configured on the two sides of the exposed end of the movable component 26, respectively and a joint portion (not shown) is arranged on the back plate of the display panel 14, that the pivots 266 are pivotally connected wit the joint portion to make the inclining angle of the display panel 14 be adjusted to the optimal view angle.

Accordingly, when the user uses the laptop, he can move the movable component up and down to adjust the display panel to optimal view position according to the height of the user or the operating surrounding, and adjust the display panel forwardly and backwardly to optimal view angle at the same time. When the user moves the movable component upward, the resilience of the springs are provided to help the movable component move upward, and the user can move the display panel up easily. Besides, the springs are also used to balance the weight of the display panel. Furthermore, the springs can be replaced by a Λ shape reed to make the movable component be moved downward difficultly and moved upward easily for balancing the weight of the display panel.

To sum up, the present invention provides an adjusting structure to make the display panel of the laptop be stretched up and down and leaned forwardly and backwardly, and the user can obtain an optimal view angle to fit the ergonomics and be good for health. This invention also solves the troubles with the limited operating space of the display panel to enhance the operational convenience.

Although the present invention has been explained in relation to its preferred embodiment, it is to be understood that other modifications and variation can be made without departing the spirit and scope of the invention as hereafter claimed.

What is claimed is:

1. An adjusting structure of a laptop, said laptop including a host and a display panel, said adjusting structure comprising:
    a main body having a transverse portion and a longitudinal portion, wherein an interior room is formed inside said longitudinal portion to form an opening on the top of said longitudinal portion and said transverse portion is adjustable pivotally connected with said host;
    at least one track configured on an inner wall of said longitudinal portion; and
    a movable component configured in said interior room matching said track to be moved longitudinally along said track and exposed from said opening, wherein said display panel of said laptop is configured on an exposed end of said movable component.

2. An adjusting structure of laptop according to claim 1, wherein two pivots are configured on the two sides of said exposed end of said movable component, respectively to be adjustable pivotally connected with said display panel.

3. An adjusting structure of laptop according to claim 1, wherein a plurality of balls are spread between said movable component and said track to help said movable component to move.

4. An adjusting structure of laptop according to claim 1, wherein at least one friction element set between said movable component and said track is used to against said movable component.

5. An adjusting structure of laptop according to claim 1, wherein at least one latching device is configured between said movable component and said track to control the movement of said movable component.

6. An adjusting structure of laptop according to claim 1, wherein an end of at least one elastic element is configured on said movable component and another end of said elastic element is configured on an inner wall of said main body.

7. An adjusting structure of laptop according to claim 6, wherein said elastic element is a spring.

8. An adjusting structure of laptop according to claim 6, wherein said elastic element is Λ shape reed.

9. An adjusting structure of laptop according to claim 1, wherein said main body is assembled with a front shell body and a back shell body.

10. An adjusting structure of laptop according to claim 9, wherein at least one fixing block is arranged on an inner wall of said back shell body, and at least one fixing groove is arranged on the surface of said movable component in opposition to said fixing block, to make said fixing groove move along said fixing block.

11. An adjusting structure of laptop according to claim 1, wherein said movable component includes a movable plate matching with said track and a shielding cover covering said movable plate, and at least one cable groove is arranged inside said movable plate to accommodate the partial wirings of said laptop.

12. An adjusting structure of laptop according to claim 1, wherein two clip edges are configured on the two ends of said transverse portion, respectively, and two fixing elements are configured on the lower edge of said display panel relative to said clip edges and wedged in said clip edges.

* * * * *